US011225878B1

(12) United States Patent
Motyka et al.

(10) Patent No.: US 11,225,878 B1
(45) Date of Patent: Jan. 18, 2022

(54) ABRADABLE COMPOSITE MATERIAL AND METHOD OF MAKING THE SAME

(71) Applicant: Technetics Group LLC, Charlotte, NC (US)

(72) Inventors: Elaine Motyka, Port Orange, FL (US); Robert Schricker, Deland, FL (US); Gerald Caldwell, Chapin, SC (US); Jarell Spears, Philadelphia, PA (US); Thomas Parr, Stafford, TX (US); Kelly Ceiler, Daytona Beach, FL (US); Tim Appel, Deland, FL (US)

(73) Assignee: Technetics Group LLC, Charlotte, NC (US)

( * ) Notice: Subject to any disclaimer, the term of this patent is extended or adjusted under 35 U.S.C. 154(b) by 309 days.

(21) Appl. No.: 15/846,638

(22) Filed: Dec. 19, 2017

Related U.S. Application Data

(60) Provisional application No. 62/437,555, filed on Dec. 21, 2016.

(51) Int. Cl.
*F01D 11/12* (2006.01)
*B22F 1/00* (2006.01)
*B22F 3/11* (2006.01)

(52) U.S. Cl.
CPC ............ *F01D 11/122* (2013.01); *B22F 1/007* (2013.01); *B22F 3/1146* (2013.01); *B22F 2003/1106* (2013.01); *F05D 2220/32* (2013.01); *F05D 2240/55* (2013.01); *F05D 2300/514* (2013.01)

(58) Field of Classification Search
None
See application file for complete search history.

(56) References Cited

U.S. PATENT DOCUMENTS

| | | | |
|---|---|---|---|
| 3,985,513 A | 10/1976 | Silaev et al. | |
| 5,434,210 A * | 7/1995 | Rangaswamy | C23C 4/04 428/403 |
| 5,536,022 A | 7/1996 | Sileo et al. | |
| 5,780,116 A | 7/1998 | Sileo et al. | |
| 6,887,530 B2 | 5/2005 | Fiala et al. | |
| 7,135,240 B2 | 11/2006 | Fiala et al. | |
| 7,179,507 B2 | 2/2007 | Fiala et al. | |
| 8,172,519 B2 | 5/2012 | Jarrabet et al. | |
| 2004/0023056 A1 * | 2/2004 | Braillard | B22F 3/11 428/570 |
| 2010/0119706 A1 | 5/2010 | Werner | |

(Continued)

FOREIGN PATENT DOCUMENTS

| | | |
|---|---|---|
| EP | 1013782 B1 | 6/2000 |
| EP | 1108857 A2 | 6/2001 |

(Continued)

*Primary Examiner* — Humera N. Sheikh
*Assistant Examiner* — Elaine M Vazquez
(74) *Attorney, Agent, or Firm* — Perkins Coie LLP

(57) ABSTRACT

An abradable composite material comprising a matrix of sintered metallic particles and non-metallic solid lubricants disposed within the interstitial spaces of the matrix is described. The abradable composite material is capable of being used with, e.g., titanium-alloy blades of a gas turbine at least in part because the abradable composite material does not cause excessive wear or damage to the blades of the gas turbine. Methods of forming the abradable composite material are also described.

8 Claims, 3 Drawing Sheets

(56) References Cited

U.S. PATENT DOCUMENTS

| | | | | |
|---|---|---|---|---|
| 2015/0290771 A1* | 10/2015 | Li | ............................ | B24D 3/06 |
| | | | | 51/295 |
| 2015/0308281 A1* | 10/2015 | Strock | .................... | F16J 15/444 |
| | | | | 415/173.4 |
| 2016/0003083 A1 | 1/2016 | Delisle et al. | | |

FOREIGN PATENT DOCUMENTS

| | | | | |
|---|---|---|---|---|
| GB | 1456554 A | * | 11/1976 | ......... C22C 32/0026 |
| WO | 1998/026158 | | 6/1998 | |

\* cited by examiner

ABRADABLE COMPOSITE MATERIAL AND METHOD OF MAKING THE SAME

CROSS-REFERENCE TO RELATED APPLICATION(S)

This application claims priority to U.S. Provisional Patent Application No. 62/437,555, filed Dec. 21, 2016, the entirety of which is hereby incorporated by reference.

BACKGROUND

With reference to FIG. 1A, axial gas turbines generally include multiple axially-aligned blade rings 10, with each blade ring 10 including multiple blades 11 extending radially away from a rotor shaft 20 that extends through each of the blade rings 10.

With reference to FIG. 1B, a single blade ring 10 with a reduced number of blades 11 is shown for simplicity. As shown in FIG. 1B, the blade tips 12 of each blade 11 are in close proximity to a ring seal segment 13. This configuration is used in order to minimize the flow of gases around the blade tips 12. The turbine becomes more efficient as the gap between the blade tips 12 and the ring seal segment 13 decreases.

After the turbine engine starts, the blades 11 extend in a radially outward direction due to thermal expansion and strain under radial loadings. As a result, the blade tips 12 move closer to the ring seal segment 13. The ring seal segment 13 may expand radially outwardly as it heats up, but an outer casing (not shown) may somewhat constrain this radial outward expansion of the ring seal segment 13 (especially in take-off, climb, and other hard conditions experienced in, e.g., aero engines, where the casing does not have time to expand as fast as the blades). Therefore, in some situations such as those mentioned previously, blade expansion results in closing the gap between the blade tips 12 and the ring seal segment 13.

In many prior art devices, this expansion leads to the blade tips 12 contacting and rubbing against the ring seal segment 13. From a blade standpoint, this is generally undesirable, as it tends to cause excessive wear and/or thermal damage to the blade tips 12. However, it is still desirable to get the blade tips 12 as close to the ring seal segment 13 as possible in order to improve engine efficiency.

In view of the above-described problems with blade tips rubbing against ring seals, abradable seal materials and coatings have been developed to minimize the gap between the seal material/coating and the blade tips (to thereby increase efficiency) while also minimizing damage to the blade tips. These materials and coatings are designed to break away in small, controlled portions when contact occurs between the blade tips and the abradable material in order to prevent damage to the blade tips. However, conventional abradable materials are not capable of eliminating or sufficiently minimizing wear and heating when the blades are made of bare open-tip titanium alloys, especially under high-speed, high-incursion conditions. Yet the ability to use bare titanium-alloy blades is highly desirable in, for example, high pressure compressor sections of aircraft turbine engines.

Another issue posed by known abradable seal materials is that they are typically applied as a coating deposited in several layers using a thermal spray process. The components of the coating material are mixed and then heated and propelled at a substrate. The coating material adheres to the substrate via mechanical bonding. The resulting coating generally ranges in hardness and has relatively low porosity. The coating is generally limited in thickness, and only certain components can be used in the coating material due to the manner of application. As a result, the coatings lack the reduced fracture toughness on the microstructural scale that is desirable in an abradable material. Other limitations relating to the mechanical properties of the coating may also be experienced. For example, the coatings have the problem of having internal defects within the relatively dense microstructure and these pores and cracks can allow crack initiation and propagation that leads to fracture under blade contact and removal of large sections of coating. Large wear debris such as this can cause damage downstream in the turbine and negatively affect the sealing capability of the coating.

Accordingly, a need exists for a material that can be used to minimize or eliminate the spacing between blade tips and a casing to thereby improve turbine efficiency, but which does not suffer from some or all of the drawbacks identified above.

SUMMARY

This summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present application relates to embodiments of an abradable composite material. In some embodiments, the abradable composite material includes a matrix of sintered metallic particles with non-metallic solid lubricant particles disposed within the matrix of sintered metallic particles. The matrix of sintered metallic particles generally has a porosity, and the non-metallic solid lubricant particles can reside within some of the interstitial spaces of the matrix of sintered metallic particles.

The present application further relates to embodiments of making an abradable composite material. In some embodiments, the method includes: blending metallic particles and non-metallic solid lubricant particles to form a blend; depositing the blend in a forming mold on a layer by layer basis; sintering the blend deposited in the mold; densifying the sintered material; and performing a second sintering operation on the densified material.

The abradable composite material described herein is capable of being used with, e.g., titanium-alloy blades because the interaction between the blades and the disclosed abradable composite material does not lead to excessive wear or damage to titanium or titanium-based alloy turbine engine blades. The disclosed abradable composite material exhibits microstructurally-localized fracture locations and less wear of titanium and titanium-alloy blades when contacting the abradable composite material at high speeds and incursion rates. Because the abradable composite material is suitable for use with titanium and titanium-alloy blades, it is also suitable for many other applications and with many other materials, such as any application where a rotating blade contacts a seal around the circumference of the blades (e.g., fans, impellers, turbochargers, etc.) and where the blades may be composed of Ti, Ni, Co, Fe or alloys of these.

The disclosed abradable composite material has a particular metal matrix microstructure and contains porosity and solid lubricant in quantity and distribution to allow for improved fracture within the microstructure so that the abradable material wears sacrificially to the blade without failing by gross fracture, thereby minimizing wear and damage to the blade tip while maintaining an effective seal. The abradable composite material described herein can also be attached to, e.g., a shroud by metallurgical bonding, a stronger bond that the mechanical bond of previously known abradable coatings.

These and other aspects of the abradable composite material described herein will be apparent after consideration of the Detailed Description and Figures herein. It is to be understood, however, that the scope of the claimed subject matter shall be determined by the claims as issued and not by whether given subject matter addresses any or all of issues noted in the Background or includes any features or aspects recited in this Summary.

BRIEF DESCRIPTION OF THE DRAWINGS

Non-limiting and non-exhaustive embodiments of the disclosed abradable composite material, including the preferred embodiment, are described with reference to the following figures, wherein like reference numerals refer to like parts throughout the various views unless otherwise specified.

DETAILED DESCRIPTION

Figure 1A:
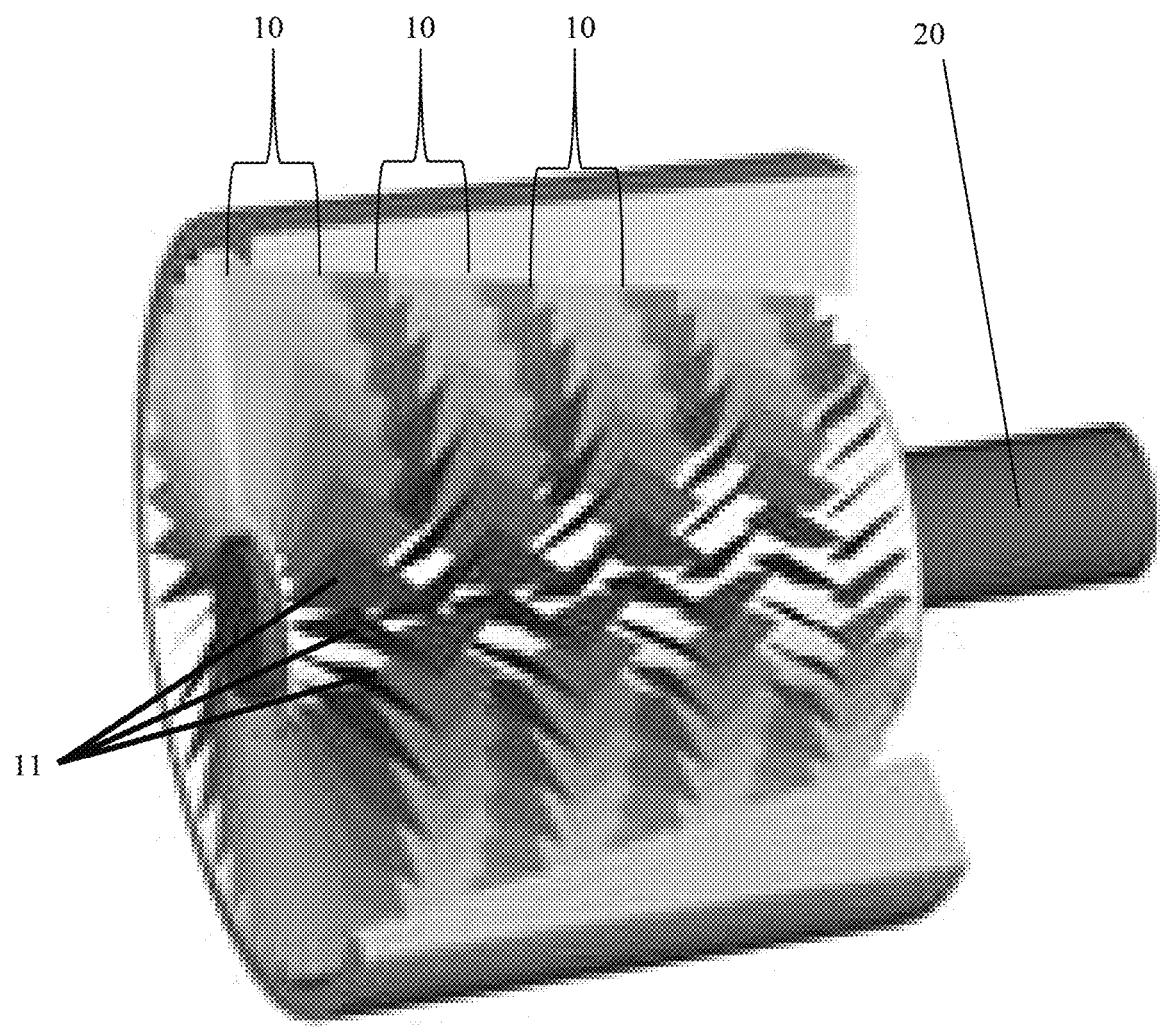
FIG. 1A is an illustration of a axial turbine engine including a row of axially aligned ring blades.
Figure 1B:
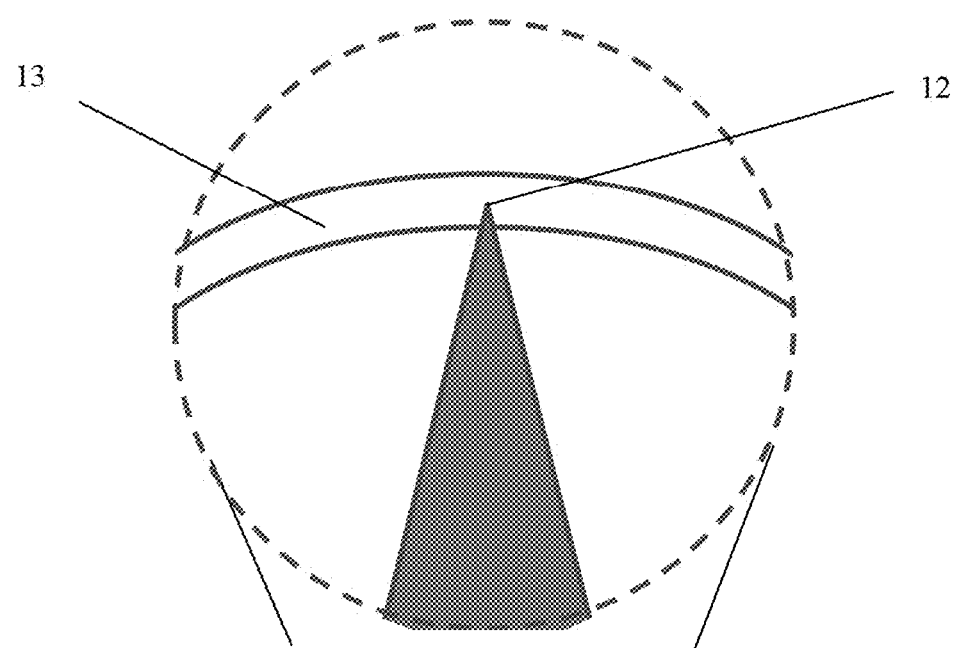
FIG. 1B is an illustration of a single ring blade and a ring seal used therewith in an axial turbine engine.
Figure 1B:
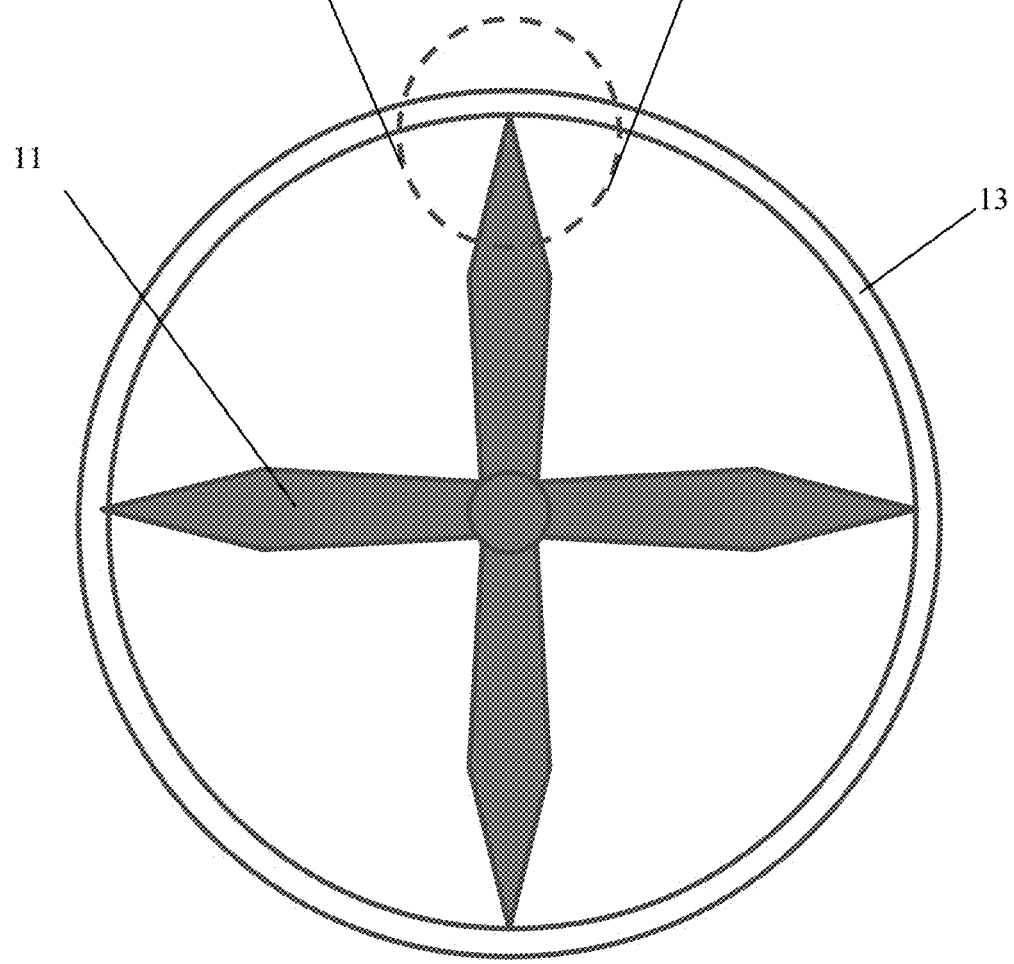

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Described herein are various embodiments of an abradable composite material and various embodiments of a method for making an abradable composite material.

In some embodiments, the abradable composite material includes a matrix of sintered metallic particles with non-metallic solid lubricant particles disposed within the matrix of sintered metallic particles. In some embodiments, the matrix of sintered metallic particles has a porosity, and the non-metallic solid lubricant particles reside within some of the interstitial spaces of the matrix of sintered metallic particles.

The metallic particles making up the matrix of sintered metallic particles are generally selected from any Ni-, Fe-, or Co-based superalloy. Generally speaking, these classes of metallic particle are suitable for use in embodiments of the disclosed abradable composite material because they resist oxidation at high temperatures. Examples of metallic particles suitable for use in the matrix include, but are not limited to, Hastelloy-X™ and FeCrAlY. The superalloys used in embodiments described herein can also be treated to form an intermetallic phase, such as phases of Ni aluminide or Fe aluminide. In some embodiments, the matrix includes only one type of metallic particle (e.g., only FeCrAlY particles), while in other embodiments, the matrix can include more than one type of metallic superalloy particle.

The amount of metallic particles in the abradable composite material is generally not limited, though in some embodiments, the metallic particles are from 50 to 99 wt % of the abradable composite material or from 25 to 95 wt % of the abradable composite material. In some embodiments, the amount of non-metallic solid lubricant particles is specified within a certain wt % range (as discussed in greater detail below), and the metallic particles make up the remainder of the composite material.

In some embodiments, the shape of the metallic particles used in the matrix is specifically selected in order to help provide an improved abradable composite material. For example, the shape of the metallic particles can be selected from elongaged, fibrous, and spherical shapes. The elongated and fibrous shapes are generally defined by their high aspect ratio. Thus, in some embodiments, a fibrous or elongated particle shape is achieved by using metallic particles having an initial pre-sintered aspect ratio higher than 5.0, such as in the range of from 6.7 to 25.0. The sintered final structure may have an aspect ratio in the range of from 1.5 to 10.0 When elongated or fibrous metallic particles are used, the length of each particle can generally be in the range of from 5 to 3000 microns.

As noted previously, the matrix of sintered metallic particles includes a porosity due to interstitial spaces between individual particles. The porosity of the matrix can generally be measured by taking a cross-section of the composite material at any location within the composite material and in any direction, and measuring the area of void space and comparing it against the area of the cross-section as a whole. In some embodiments, this area of void space is in the range of 15 to 85% of the total cross sectional area, and preferably in the range of from 50 to 65%.

In some embodiments, the porosity of the matrix of sintered metallic particles is consistent or generally consistent throughout the abradable composite material. Alternatively, the porosity can be variable at different locations within the abradable composite material. For example, when the abradable composite material is in the form of a ring, the porosity can be greater at the inner diameter of the ring and gradually decrease through the thickness of the ring until reaching a lowest porosity at the outer diameter of the ring. The reverse is also possible, where the porosity is lowest at the inner diameter and highest at the outer diameter. In addition to gradual changes in porosity, the composite material can also include, for example, a first section of the composite material having a constant or generally constant porosity throughout the first section abutting a second section of the composite material having a lower or higher constant or generally constant porosity throughout the second section. The difference in porosity between adjoining sections of constant or generally constant porosity can be relatively small, such as a matter of a few percentage points, or relatively large, such as a difference of 10% or more. The composite material can also include more than two sections within which the porosity is constant or generally constant, as well as one or more sections of constant or generally constant porosity together with one or more sections in which the porosity gradually changes throughout the section.

The abradable composite material described herein can further include non-metallic solid lubricant particles. The non-metallic solid lubricant particles are generally dispersed within the matrix of sintered metallic particles, such as within interstitial spaces in the matrix. Generally speaking, the solid lubricant particles are non-metallic and stable at the operating temperatures of the machinery in which the composite material is used (e.g., turbines).

In some embodiments, the non-metallic solid lubricant particles are hexagonal boron nitride. Hexagonal boron nitride can specifically be used in some embodiments. Ceramic materials similar to hexagonal boron nitride can also be used. Examples of other materials suitable for use as the non-metallic solid lubricant include, but are not limited to, bentonite, graphite, and molybdenum disulfide. Harder non-metallic material such as aluminum oxide, titanium oxide, zirconium oxide, and other oxide ceramics can also be used. In some embodiments, only one type of non-metallic solid lubricant particle is used, while in other embodiments, more than one type of non-metallic solid lubricant particle can be included in the matrix.

The individual non-metallic solid lubricant particles can be clad or unclad with metallic material. Cladding the solid lubricant particles can help to, e.g., assist with sintering and bond solid lubricant particles to the metallic particle matrix. Any suitable cladding material can be used, including, but not limited to, nickel alloy cladding.

The amount of non-metallic solid lubricant particles in the abradable composite material can vary based on whether the lubricant particles are clad or not. When the non-metallic solid lubricant particles are not clad, the particles can be from 1 to 50 wt % of the composite material, such as 15 wt %. When the non-metallic solid lubricant particles are clad, the particles can be from 5 to 75 wt % of the composite material, such as 30 to 45 wt %.

The size and shape of the non-metallic solid lubricant particles is generally not limited. In some embodiments, the solid lubricant particles may have a generally spherical shape, rounded shape, angular shape, or flaky shape, and a particle size of from 1 to 1000 microns. In some embodiments, the mean particle size of the solid lubricant particles is 10 to 600 microns.

In some embodiments, the concentration of the solid lubricant particles is consistent or generally consistent throughout the abradable composite material. Alternatively, the concentration of solid lubricant particles can be variable at different locations within the abradable composite material. For example, when the abradable composite material is in the form of a ring, the concentration of solid lubricant particles can be greater at the inner diameter of the ring and gradually decrease through the thickness of the ring until reaching a lowest concentration at the outer diameter of the ring. The reverse is also possible, where the concentration is lowest at the inner diameter and highest at the outer diameter. In addition to gradual changes in concentration, the composite material can also include, for example, a first section of the composite material having a constant or generally constant concentration of solid lubricant particles abutting a second section of the composite material having a lower or higher constant or generally constant concentration. The difference between adjoining sections having different concentration can be relatively small or relatively large. Any number of sections with constant concentrations can be used, and can be used in conjunction with one or more sections having varying concentration throughout the section.

In some embodiments, the composite material consists of only the sintered metallic particle matrix and the non-metallic solid lubricant particles. In some embodiments, the composite material consists essentially of the sintered metallic particle matrix and the non-metallic solid lubricants, but may include other minor components that do not drastically affect the composite material.

As discussed in greater detail below, the abradable composite material described herein may be in the form of a solid, molded part. In such embodiments, the solid molded part may generally have any shape, size, or dimensions required for the specific application in which the abradable composite material is to be applied. In some embodiments, the molded part is in the form of a ring, or a length of material that can be deposited in a ring form. When the abradable composite material is in the form of a ring or a length of material, the molded part will have a thickness. In some embodiments, the thickness may be from 0.5 mm to greater than 10 mm.

Figure 2:
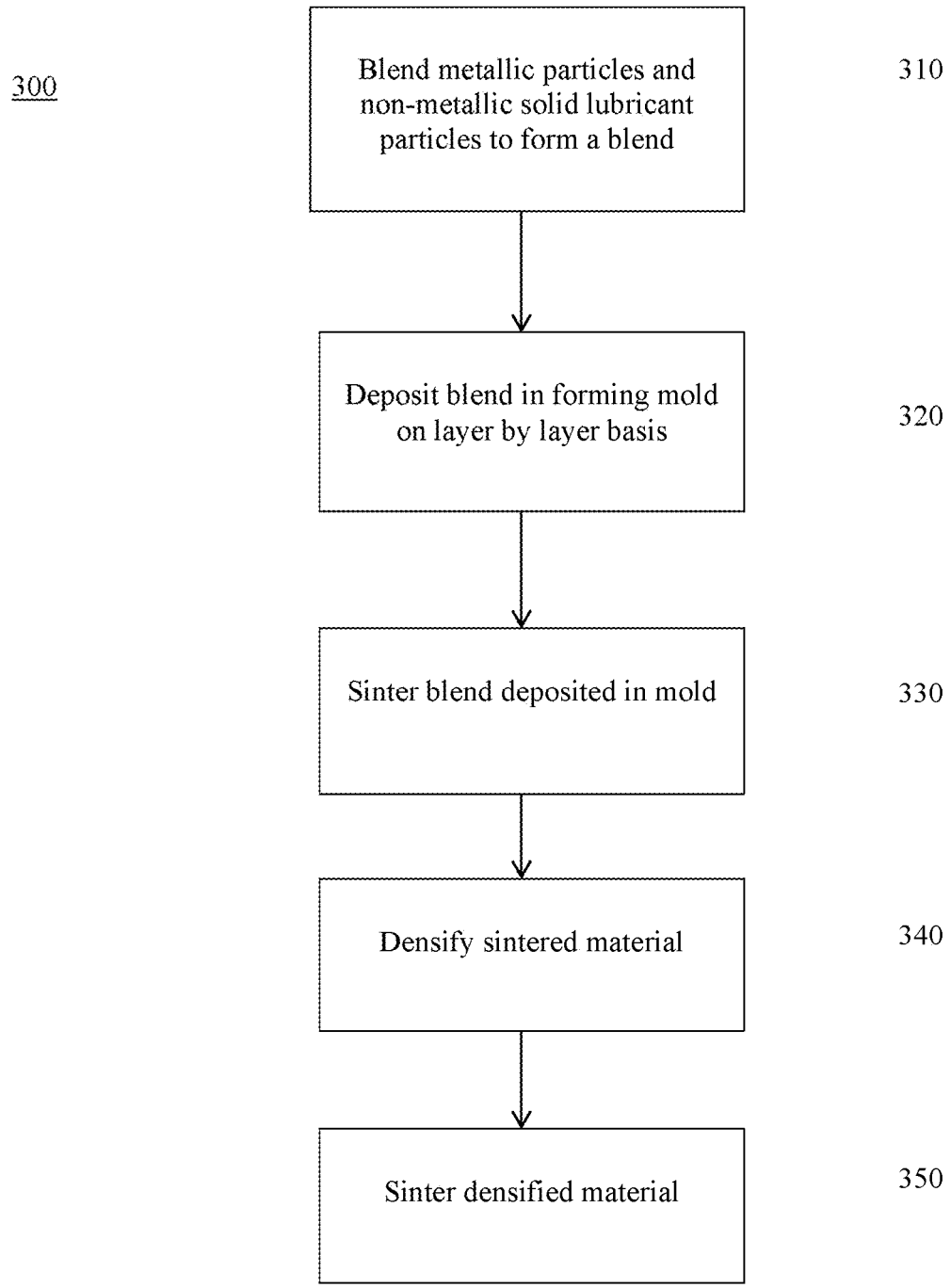
FIG. 2 is a flow chart illustrating a method of making an abradable composite material according to various embodiments described herein.

Various embodiments of a method for making the abradable composite material described above are set forth below. With reference to FIG. 2, the method 300 generally includes a step 310 of blending metallic particles and non-metallic solid lubricant particles to form a blend; a step 320 of depositing the blend in a forming mold on a layer by layer basis; a step 330 of sintering the blend deposited in the mold; a step 340 of densifying the sintered material; and a step 350 of performing a second sintering operation on the densified material.

Regarding step 310, the method generally begins by blending together the non-metallic solid lubricant particles and the metallic superalloy particles. The specific material used for each component is similar or identical to the material described previously, and the non-metallic particles and the metallic particles can be added at any ratio such that the final weight percentage compositions described above are met. Any manner of blending together the material can be used, including the use of any suitable apparatus.

Regarding step 320, the blended material is deposited in a forming mold. The mold can be, e.g., a flat plate, a curve plate, a flat or curved trough, a cylinder, etc. In some embodiments, the blended material is deposited in a forming mold on a layer by layer basis. Generally speaking, each layer is relatively thin, and the number of layers deposited is dependent on the final desired thickness. The manner of depositing the thin layers of material can generally include flowing the layers on to the mold surface using air or a condensed fluid. Suitable methods for conducting this step include, but are not limited to, dry tumbling, sifting, or propelling, each of which uses air or gas to flow the material. The blended material can also be suspended in a condensed fluid such as water and flowed on to the mold surface on a layer by layer basis.

In an alternate embodiment, the blended material is deposited in a forming mold using a continuous process. In the continuous process, a slurry is prepared by adding the blended material and water (or other condensed fluid) to a tank. A pump is then used to continuously feed the slurry to nozzles that spray the slurry onto the mold in a continuous manner. In a variation of this process, the slurry can be deposited on the mold on a layer by layer basis if the mold moves under the nozzles or the nozzles move across the surface of the mold.

Any type of forming mold can be used, including molds having any shape, size or dimensions, such that the resultant molded part can have any of a variety of shapes, sizes and dimensions.

Regarding step 330, the blended material deposited in the forming mold is sintered. The sintering step 330 is generally aimed at bonding together the metallic particles of the matrix (and bonding solid lubricant particles to the metallic matrix particles if the solid lubricant particles are clad). The temperature used for the sintering step is generally not limited, though the temperature is preferably below the liquidus of the metallic particle material, and more preferably below the solidus of the metallic particle material. The duration of the sintering step is also not limited, and may be, e.g., from minutes to hours long. In some embodiments, the sintering step is carried out in hydrogen atmosphere, though $CO_2$, ammonia, argon, nitrogen, or any other reducing inert gas also be used. In some embodiments, the sintering is carried out in a vacuum.

Regarding step 340, the sintered material is subjected to densifying by a compaction process. The sintered material is typically removed from the mold prior to this step. The densifying step can be carried out using any suitable process, such as rolling, calendaring, and hydraulic pressing. The densifying step is generally used to achieve the proper contact of particles in anticipation for a further sintering step. While step 340 will generally take place before second sintering step 350, the densifying step can also be carried out before first sintering step 330, both before first sintering step 330 and before second sintering step 350, or may be eliminated altogether.

Regarding step 350, a second sintering step is carried out. The second sintering step can be similar or identical to the first sintering step. In some embodiments, the densified sintered material is placed in a curved mold for the second sintering step. The curvature of the curved mold used during the second sintering step can be selected to match the radius of curvature desired for the final product. In this manner, the material conforms to the curvature of the curved mold during the second sintering step and is provided with the desired final radius of curvature. In some embodiments, the curved mold may be used because the material is too brittle and rigid after the second sintering step and thus cannot be formed into a ring after the second sintering step. However, if placed in a curved mold during the second sintering step, the material will creep or flow in a solid state during the second sintering step and thereby take on the shape of the curved mold. A release agent can be placed in the mold prior to placing the densified sintered material in the mold so that the material can be more easily removed from the mold after the second sintering step.

Optional post processing can also be a part of the method described herein. Optional post processing steps include, but are not limited to, general machining of the material to achieve desired final dimensions using any techniques and equipment known to be suitable for such processing, milling the material to a specific thickness using any techniques and equipment known to be suitable for such processing, bandsawing the material to a specific size using any techniques and equipment known to be suitable for such processing, and/or brazing the material to, e.g., an outer shroud segment using any techniques and equipment known to be suitable for such processing. In some embodiments, the brazing steps helps to form a metallurgical bond between the aradable composite material and the material to which it is brazed.

Example 1

In one non-limiting example of the above described method, the following steps are carried out:

mechanical blending of dry Hastelloy X fiber particles and boron nitride particles in a rake tumbler;

deposition of the blended material by dry-felting or slurry felting;

sintering in hydrogen atmosphere at 2,100 to 2,135° F. for 1 to 4 hours;

densifying by rolling or calandering;

secondary sintering in hydrogen at 2,100 to 2,135° F. for 1 to 8 hours milling to desired thickness bandsawing to desired size; and brazing to attach to, e.g., an outer seal From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An abradable composite material consisting essentially of:
   a matrix of sintered metallic particles, the matrix having a porosity; and
   a plurality of non-metallic solid lubricant particles, the non-metallic solid lubricant particles disposed in interstitial spaces of the matrix of sintered metallic particles;
   wherein the metallic particles of the matrix of sintered metallic particles are Ni-based alloy particles, Fe-based alloy particles, or a combination thereof,
   wherein the abradable composite material comprises from 15 to 50 wt % non-metallic solid lubricant particles,
   wherein the non-metallic solid lubricant particles have a particle size ranging from about 200 to 1000 microns,
   wherein the non-metallic solid lubricant particles are not clad with metallic material, and
   wherein the non-metallic solid lubricant particles are hexagonal boron nitride particles, aluminum oxide, titanium dioxide, zirconium oxide, or combinations thereof.

2. The abradable composite material of claim 1, wherein the metallic particles of the matrix of sintered metallic particles further comprises Co-based alloy.

3. The abradable composite material of claim 1, wherein the abradable composite material comprises from 35 to 85 wt % metallic particles.

4. The abradable composite material of claim 1, wherein the metallic particles of the matrix of sintered metallic particles have an elongated, fibrous or spherical shape.

5. The abradable composite material of claim 1, wherein the porosity of the matrix of sintered metallic particles is in the range of from 15 to 80%.

6. The abradable composite material of claim 1, wherein the abradable composite material comprises 15 wt % non-metallic solid lubricant particles.

7. The abradable composite material of claim 1, wherein the abradable composite material comprises 50 wt % non-metallic solid lubricant particles.

8. The abradable composite material of claim 1, wherein non-metallic solid lubricant particles have a spherical shape, rounded shape, angular shape, or flaky shape.

* * * * *